United States Patent [19]

Andrews

[11] Patent Number: 4,894,659
[45] Date of Patent: Jan. 16, 1990

[54] RADAR ALTIMETER SYSTEMS

[75] Inventor: Frank P. Andrews, Easton, England

[73] Assignee: Smiths Industries Public Limited Company, London, England

[21] Appl. No.: 253,029

[22] Filed: Oct. 4, 1988

[30] Foreign Application Priority Data

Oct. 7, 1987 [GB] United Kingdom ............... 8723566
Nov. 27, 1987 [GB] United Kingdom ............... 8727756

[51] Int. Cl.$^4$ .......................................... G01S 13/08
[52] U.S. Cl. ................................. 342/121; 342/64
[58] Field of Search ................................. 342/63–65, 342/120, 121, 134, 175, 59

[56] References Cited

U.S. PATENT DOCUMENTS

| | | | |
|---|---|---|---|
| 3,213,451 | 10/1965 | Alpers | 343/17.1 |
| 3,277,467 | 10/1966 | Barney | 343/7.3 |
| 3,781,530 | 12/1973 | Britland et al. | 235/150.26 |
| 4,698,635 | 10/1987 | Hilton et al. | 342/64 |

Primary Examiner—Thomas H. Tarcza
Assistant Examiner—Mark Hellner
Attorney, Agent, or Firm—Pollock, Vande Sande and Priddy

[57] ABSTRACT

An aircraft microwave altimeter system has a threshold detector with two parallel channels that provide two sets of output signals at two different levels of sensitivity. The signals at the higher sensitivity are supplied to a display whereas those at the lower sensitivity are supplied to a navigation system. A comparator indicates a fault in the system if the two sets of output signals differ by more than a predetermined amount.

15 Claims, 1 Drawing Sheet

RADAR ALTIMETER SYSTEMS

BACKGROUND OF THE INVENTION

This invention relates to radar altimeter systems.

Radar altimeters are commonly used in aircraft to provide information to the pilot as the aircraft's height above ground. It has also been proposed to use the output from a radar altimeter to provide information to terrain reference navigation (TRN) systems. TRN systems have a stored digital database of ground contours over which the aircraft is to fly and correlate height information from the radar altimeter with the database to derive information as to the position of the aircraft in terms of, for example, latitude and longitude.

Radar altimeters take one of two different forms: one uses short pulses of radar emissions, and the other uses a continuous wave, frequency modulated (FMCW) radar emission. The pulsed form of radar has an advantage over continuous wave equipment, in that it is more readily responsive to relatively small radar targets, such as low density woods, small hills and so on. This can be important in low flying aircraft, since the pilot needs information about his height above any possible collision object on the ground, not just information about height above the ground itself. Pulsed equipment can also be rendered less susceptible to detection from outside the aircraft, making the aircraft itself less easy to detect by hostile observers.

The inherent sensitivity of pulsed radar altimeters, however, makes them less suitable for use in TRN systems since the database in such systems is usually of only the more general features such as ground contours. Correlation of the output of a pulsed radar altimeter with such a database would be more difficult than with a less sensitive continuous wave radar altimeter.

One solution to this is for the aircraft to have two altimeters, one of the continuous wave type, providing its output to the TRN system, and the other of the pulsed type, providing its output to the pilot's display. This, however, doubles the cost of acquiring, of installing and of maintaining the radar altimeters. Because each altimeter will require its own antenna this may present problems of installation. The increased weight, power consumption, heat dissipation and risk of external detection caused by this duplication can also be a significant problem. Also, FMCW systems are less readily adjustable according to the nature of the ground surface over which they are being used.

BRIEF SUMMARY OF THE INVENTION

It is an object of the present invention to provide a radar altimeter system that can be used, at least in part, to alleviate the above-mentioned problems. For clarity, the term radar altimeter is used to denote any microwave altimeter.

According to one aspect of the present invention, there is provided an aircraft microwave altimeter system comprising means for transmitting microwave signals to the ground, means for receiving microwave signals reflected from the ground and objects on the ground, means for deriving from the received signals information as to the height of the aircraft above the ground or objects on the ground, the system including threshold detector means arranged to provide two sets of output signals in accordance with two respective different threshold levels, the first set of output signals being supplied to display means, and the second set of output signals having a lower sensitivity than said first set of output signals and being supplied to navigation means.

The threshold detector means may include two parallel threshold detector channels that are arranged to supply the respective first and second sets of output signals in respect of the same received signals. Alternatively, the threshold detector means have a single channel that is selectively adjustable in threshold sensitivity, the threshold detector means being arranged to supply alternately output signals at one sensitivity level to said display means and at another, lower sensitivity level to said navigation means.

The means for transmitting microwave signals preferably transmits pulsed microwave signals. Information derived from a greater number of reflected pulses may be supplied to the display means than to the navigation means.

The threshold detector means may be responsive to the magnitude of the received signals such that the first set of output signals is provided in response to received signals above a first magnitude and the second set of output signals is provided in response to received signals above a second magnitude greater that the first magnitude. The threshold detector means may include amplifier means which is arranged to produce from the received microwave signals two sets of intermediate output signals at different gains, and wherein the threshold detector means passes to said display means and navigation means respectively those of the two sets of intermediate output signals above the same threshold level.

Alternatively, the threshold detector means may be responsive to the duration of the received signals such that the first set of output signals is provided in response to received signals longer than a first duration and the second set of output signals is provided in response to received signals longer than a second duration, said second duration being longer that said first duration. The threshold detector means may be responsive to both the magnitude and duration of the received signals.

The altimeter system may include comparator means arranged to receive said first and second sets of output signals, and said comparator means being arranged to provide an indication when there is a difference between said first and second sets of output signals greater than a predetermined difference. The system may be arranged to supply only one of the set of output signals to both the display means and the navigation means when the indication provided by the comparator means indicates that the other one of the sets of output signals is faulty. The system may be arranged to increase the sensitivity of the threshold detector means if the said one set of output signals is the said second set of output signals.

The threshold levels of the threshold detector means may be modified in accordance with the height of the aircraft. The threshold levels of the threshold detector means may be modified in accordance with the terrain conditions over which the aircraft is flying. The threshold levels of the threshold detector means may be modified in accordance with the flight conditions of the aircraft.

The navigation means preferably includes a terrain reference navigation system having a database of ground contour information. The display means may include a visual display means.

An aircraft radar altimeter system in accordance with the present invention will now be described, by way of example, with reference to the accompanying drawings.

BRIEF DESCRIPTION OF THE DRAWINGS

With reference to FIG. 1, the system include a conventional pulsed microwave transmitter 1 that supplied signals to an antenna 2 which directs a pulsed beam of microwave energy towards the ground 3. Energy reflected from the ground 3, and objects 4 on the ground, is received by a second antenna 5 which supplied signals to a conventional receiver 6. The receiver 6 supplies an output to a detector 7 which in turn provides an output to a threshold detector 8 via a video amplifier 9.

Figure 1:
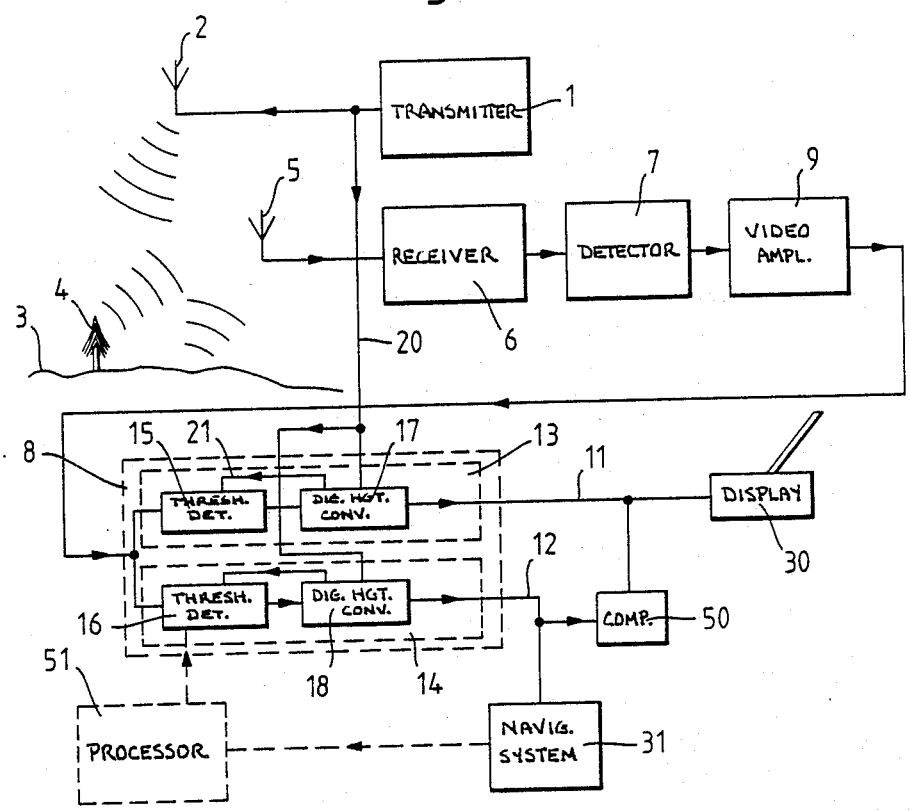
FIG. 1 shows the system schematically.

The threshold detector 8 may take several different forms which each provide two sets of output signals, on lines 11 and 12 at different threshold sensitivity levels. The threshold detector 8 shown in FIG. 1 comprises two separate threshold detector circuits arranged as parallel channels 13 and 14 which both receive the same inputs from the video amplifier 9. Each channel 13 and 14 has it own threshold detector 15 and 16 respectively which supplies output signals to a respective digital height converter 17 and 18. In one embodiment, one of the detectors 15 has a relatively low threshold, high sensitivity so that all radar return signals with a magnitude above a noise level are passed by the detector as a first set of output signals. In particular, return signal from small, low density woods, from buildings and small hills will be supplied to the converter 17. The converter 17 derives a measure of the distance/height associated with the signal passed by the detector 15 by measurement of the time interval between transmission and reception of the radar signal, the converter 17 receiving a signal on line 20 from the transmitter 1 on each pulse transmission. The converter 17 also supplies an output signal on line 21 to control the threshold level of the detector 15 in accordance with height, the threshold being reduced, and sensitivity thereby increased, at greater heights to compensate for the reduction in signal amplitude with height. The height signal output from the converter 17 is supplied via line 11 to a pilot's head-up display 30 so that information is presented to the pilot about the clearance of the aircraft from the ground and ground obstacles.

The other detector 16 in the second channel 14 is set with a higher threshold, lower sensitivity so that only those radar returns from the ground or large objects are passed by the detector as a second set of output signals to the associated digital height converter 18. The output of the converter 18 thereby provides height information of major ground contours. An output from the converter 18 is also supplied to the detector 16 to control the threshold level with height, as in the other detector 15. The output from the converter 18 is supplied via line 12 to a terrain referenced navigation system 31 of known kind. The navigation system 31 includes a database of ground contours and may also include an inertial navigation system. Because the stored information is in respect only of major ground features, the output signals on line 12 are readily correlated with this.

The altimeter system may also include a comparator 50 that receives the two outputs on lines 11 and 12 and compares their values. If the signals differ by more than a predetermined amount, equivalent to the height of the tallest object likely to be included in the signal on line 11, but not in the signal on line 12, the comparator 50 indicates a discrepancy to the pilot. The comparator 50 could produce an output to the navigation system 31 so that it is caused to operate only on the inertial navigation system without TRN updating. If a fault should occur in signals on one line 11 and 12, or in one channel 13 or 14, this could be partly rectified by supplying signals derived from the nonfaulty line or channel to both the display 30 and the navigation system 31. If the higher sensitivity channel 14 should be faulty, the sensitivity of the other channel 13 could be increased and signals at this high sensivity supplied to both the display 30 and the navigation system 31 to ensure safe flight at the expense of accurate navigation.

The threshold levels in the detectors 15 and 16 could be preset in hardware of the detectors or by software programming prior to flight. Alternatively, the threshold levels could be adjusted by a processor 51 according to flight or terrain conditions. For example, the database in the navigation system could be programmed with information about the nature of the ground surface, such as forested, built-up, flat water, hilly and so on. This information could be supplied to the processor 51 to cause it to modify the threshold level of one or both detectors 15 or 16, as appropriate.

Figure 2:
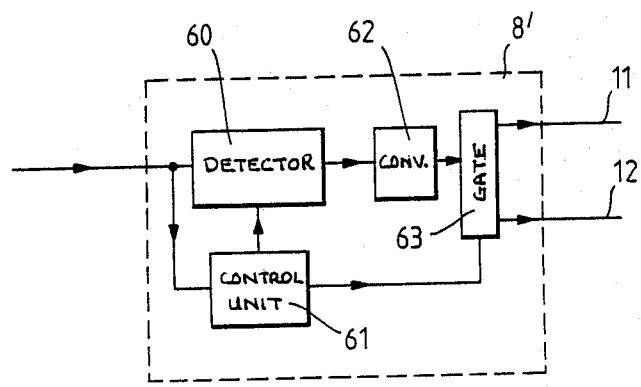
FIG. 2 shows a modification of the system.

An alternative threshold detector 8 is shown in FIG. 2, which has a single threshold detector circuit 60 that receives the video output pulses from the amplifier 9. The threshold level of the detector circuit 60 is controlled by a control unit 61 which also receives signals from the amplifier. Output signals from the detector circuit 60 are supplied via a digital height converter 62 to a gate 63 which is controlled by the control unit 61 to supply the signal either to line 11 or to line 12. The control unit 61 alternately sets the detector 60 to a high threshold, low sensitivity and to a low threshold, high sensitivity. When the detector 60 is set at a low threshold level, the control unit 61 sets the gate 63 to pass the output signal to the display 30 via line 11; when the detector is set at a high threshold, the gate 63 switches to supply the output of the detector to the navigation system 31, via line 12. For example, the output derived from each radar pulse may be supplied to the display, except for one pulse in every ten which is supplied by the gate 63 to the navigation system.

The system of the present invention enables a high sensitivity output to be supplied to the display and a lower sensitivity output supplied to the navigation system without the need to duplicate the radar altimeter. The comparator also enables a check to be provided of system integrity.

It will be appreciated that many modifications are possible to the system without departing from the present invention. The display need not be a visual display, but could, for example, provide an audible output, such as a warning when the aircraft is too low to ground objects. The invention could be used with other radar altimeter systems such as FMCW system.

The threshold detector need not necessarily operate by setting two different threshold levels above which signals are passed. Instead, only one threshold level could be set and two sets of intermediate output signals at respective different gains supplied to the detector circuit. The detector circuit would pass those of the two sets of intermediate output signals above the same threshold level. In this way, two sets of the output signals would be produced for supply to the display and navigation equipment at different sensitivity levels. In such an arrangement, the amplifier or other means by which the gain is varied is regarded as forming a part of the threshold detector means.

The threshold detector need not respond to the magnitude of signals, but could instead respond to their duration, since signal returns from small objects will have a shorter duration as well as a lower magnitude. The shorter duration signals only being supplied to the display means, the threshold detector could be responsive to both magnitude and duration, such as by integrating the signals.

What I claim is:

1. An aircraft microwave altimeter system comprising: means for transmitting microwave signals to the ground; means for receiving microwave signal reflected from the ground and objects on the ground; means for deriving from the received signals information as to the height of the aircraft above the ground or objects on the ground; threshold detector means, said threshold detector means being arranged to provide a first set of output signals in accordance with height at a first threshold level, and a second set of output signals in accordance with height at a second threshold level greater than said first threshold level; display means; means supplying said first set of output signals to said display means; navigation means; and means supplying said second set of output signals to said navigation means, such that said navigation means is supplied with signals representative of the height of the aircraft above ground whereas said display means is supplied with signals representative of the height of the aircraft above objects on the ground.

2. An aircraft microwave altimeter system according to claim 1, wherein said threshold detector means includes two parallel threshold detector channels, and wherein said two detector channels are arranged to supply the respective first and second sets of output signals in respect of the same received signals.

3. An aircraft microwave altimeter system according to claim 1 wherein the said threshold detector means has a single channel which selectively adjustable in threshold sensitivity, and wherein the said threshold detector means is arranged to supply alternately output signals at one sensitivity level to said display means and at another lower sensitivity to said navigation means.

4. An aircraft microwave altimeter system according to claim 1, wherein the said means for transmitting microwave signals transmits pulsed microwave signals.

5. An aircraft microwave altimeter system according to claim 3, wherein the said means for transmitting microwave signals transmits pulsed microwave signals, and wherein said threshold detector means supplies information derived from a greater number of reflected pulses to said display means than to said navigation means.

6. An aircraft microwave altimeter according to claim 1, wherein the said threshold detector means is responsive to the magnitude of the received signals, such that the said first set of output signals is provided in response to received signals above a first magnitude and said second set of output signals is provided in response to received signals above a second magnitude greater than the first magnitude.

7. An aircraft microwave altimeter system according to claim 6, wherein, said threshold detector means includes amplifier means, said amplifier means being arranged to produce two sets of intermediate output signals at different gains and wherein the threshold detector means passes to said display means and navigation means respectively those of the two sets of intermediate output signals above the same threshold level.

8. An aircraft microwave altimeter system according to claim 4, wherein said threshold detector means is responsive to the duration of the received signals, such that said first set of output signals is provided in response to received signals longer than a first duration and said second set of output signals is provided in response to received signals longer than a second duration, said second duration being longer than said first duration.

9. An aircraft microwave altimeter system according to claim 6, wherein said threshold detector means is responsive to both the magnitude and duration of the received signals by integration, and wherein the said first set of output signals is provided in response to integrated signals above a first magnitude and said second set of output signals is provided in response to integrated signals above a second magnitude greater than, said first magnitude.

10. An aircraft microwave altimeter system according to claim 1 including comparator means, means connecting said comparator means to receive said first and second sets of output signals, and said comparator means being arranged to provide an indication when there is a difference between said first and second sets of output signals greater than a predetermined difference.

11. An aircraft microwave altimeter system according to claim 10, wherein the system is arranged to supply only one of said sets of output signals to both the display means and the navigation means when the indication provided by said comparator means indicates that the other one of said sets of output signals is faulty.

12. An aircraft microwave altimeter system according to claim 11, including means to increase the sensitivity of said threshold detector means if the said one set of output signals is said second set of output signals.

13. An aircraft microwave altimeter system according to claim 1, including means to modify the threshold levels of said threshold detector means in accodance with the height of the aircraft.

14. An aircraft microwave altimeter system according to claim 1 including means to modify the threshold levels of said threshold detector means in accordance with the terrain conditions over which the aircraft is flying.

15. An aircraft microwave altimeter system according to claim 1 including means to modify the threshold levels of said threshold detector means in accordance with the flight conditions of the aircraft.

* * * * *